United States Patent [19]

Pieper et al.

[11] Patent Number: 4,948,411
[45] Date of Patent: Aug. 14, 1990

[54] GLASS MELTING FURNACE FOR GLAZING ENVIRONMENTALLY HAZARDOUS WASTES

[75] Inventors: Helmut Pieper; Helmut Sorg; Hartmut Zschocher, all of Lohr/Main, Fed. Rep. of Germany

[73] Assignee: Sorg GmbH & Co. KG, Lohr/Main, Fed. Rep. of Germany

[21] Appl. No.: 303,841

[22] Filed: Jan. 30, 1989

[30] Foreign Application Priority Data

Dec. 13, 1988 [DE] Fed. Rep. of Germany ....... 3841918

[51] Int. Cl.$^5$ ............................ C03B 5/03; C03B 5/20
[52] U.S. Cl. ....................................... 65/342; 65/337; 65/347
[58] Field of Search .................. 65/134, 135, 168, 335, 65/337, 340, 342, 346, 347, DIG. 4

[56] References Cited

U.S. PATENT DOCUMENTS

| | | | |
|---|---|---|---|
| 1,597,440 | 8/1926 | Ferngren | 65/337 |
| 1,818,203 | 8/1931 | Drake | 65/347 |
| 1,872,477 | 8/1932 | Mambourg | 65/135 |
| 1,875,474 | 9/1932 | McKinley | 65/347 |
| 2,122,469 | 7/1938 | Hitner | 65/337 |
| 3,226,220 | 12/1965 | Plumat | 65/342 |
| 3,420,653 | 1/1969 | Boettner | 65/347 |
| 3,499,743 | 3/1970 | Fanica et al. | 65/135 |
| 3,771,986 | 11/1973 | Stultz et al. | 65/168 |
| 4,678,493 | 7/1987 | Roberts et al. | 65/134 |

*Primary Examiner*—Joye L. Woodard
*Attorney, Agent, or Firm*—Felfe & Lynch

[57] ABSTRACT

Furnace has a melting section and a withdrawal section bounded by side walls of refractory material which extend to a glass outlet formed by an overflow edge remote from the melting section. In operation a molten glass layer, a molten layer of undissolved sulfates, and a batch layer succeed one another from the bottom up in the melting section. The withdrawal section is separated from the melting section by a first dividing wall extending downwardly and terminating above the surface of the molten glass. A second dividing wall is disposed for the formation of an underside glass passage, and at least one closable opening for withdrawing the molten sulfates is disposed at the level of the sulfate layer between the first and second dividing walls. The opening has a bottom boundary whose height is adjustable, so that it can be adjusted to lie above the surface of the glass melt.

10 Claims, 3 Drawing Sheets

GLASS MELTING FURNACE FOR GLAZING ENVIRONMENTALLY HAZARDOUS WASTES

BACKGROUND OF THE INVENTION

The invention relates to a glass melting furnace for glazing environmentally hazardous wastes, such as asbestos or demolition material containing asbestos, ashes, filter dusts and the like. The furnace has a melting section and a withdrawal section, and, in operation, a molten glass layer, a molten layer of undissolved sulfates, and a batch layer succeeding one another from the bottom up in the melting section. The withdrawal section is separated from the melting section by a first dividing wall extending downwardly into the furnace interior and terminating at a distance from the furnace floor, a second dividing wall is disposed for the formation of an underside glass passage, and a glass outlet is formed at the outer end of the withdrawal section with an overflow edge. Such a furnace is disclosed in U.S. Pat. No. 3,499,743.

U.S. Pat. No. 4,678,493 discloses an electrical melting furnace for glazing asbestos. The asbestos waste in pulverized and moistened form is fed to this melting furnace to achieve a sufficient melting rate on the one hand, and on the other hand to minimize dispersion of asbestos dust. During its operation, the melting furnace is kept at a pressure below atmospheric to prevent the escape of dust. What is considered disadvantageous in this known melting furnace is especially its high energy demand, because the evaporation of the moisture from the asbestos batch involves the loss of a great amount of thermal energy from the melt. Furthermore, the previous pulverizing of the asbestos waste requires much energy. Operation of the furnace in a partial vacuum is necessary in this case because the evaporation proceeds relatively violently, causing many particles of asbestos to be ejected from the batch. Accordingly, a high-powered blower with a filter system is provided in this known furnace, which signifies additional cost in the construction and operation of the furnace. U.S. Pat. No. 3,499,743 discloses a glass melting furnace in which a first dividing wall extends all the way into the glass layer, so that a free surface is established behind it in normal operation. If undissolved sulfates should nevertheless pass under the first dividing wall, the second dividing wall is provided in the outlet part of the furnace. The undissolved sulfates layer provides for an improved thermal gradient from the glass melt to the incoming batch and thus tends to accelerate the melting. It is a disadvantage of this furnace that the undissolved sulfates layer varies in thickness according to the composition of the input batch. This signifies that a more rational and reliable operation of the furnace is possible only if it is fed with a precisely defined batch of known composition. This requirement can be met in the conventional production of, for example, bottle glass and the like from relatively pure raw materials, but not in the glazing of wastes, since the latter have varying compositions in which at least the proportions are unknown. In the glazing of wastes in these glass melting furnaces it would thus have to be expected that at least from time to time undissolved sulfates will be contained in the glass drawn from the furnace, which makes the glass unsuitable for further processing.

The problem is therefore to create a glass melting furnace of the kind described above, in which wastes of varying composition can be glazed reliably and at low cost.

When demolition material is melted, or waste dumps are removed, however, it can happen that not only damp, but also very wet material is melted.

In this case, accumulations of water can form during storage and transport, and when they are thrown onto the molten sulfate layer floating on the glass bath they can result in explosion-like disturbances.

It is also the purpose of the invention, therefore, to create a glass melting furnace in which the charging of batch material containing free water can be surely prevented by simple means.

Also, the glass melting furnace is to be able easily to process waste materials containing asbestos, and the elimination of the water that must be removed before charging the batch is to be possible without polluting the environment.

SUMMARY OF THE INVENTION

The first dividing wall ends above the surface of the glass melt, and in the output part between the first dividing wall and the second dividing wall, at least one closable opening is disposed at the level of the sulfate layer for the withdrawal of the molten sulfates. The bottom edge of the withdrawal opening is above the level of the glass melt, and a screw conveyor leading upward at an angle is provided for the charging of the batch, the bottom end of this conveyor having a device for the removal of water.

The new glass melting furnace offers the advantage that the thickness of the sulfate layer can be kept constant, regardless of the batch being fed in. This assures that the melting of the components of the batch will be rapid and energy-saving, and that at the same time the glass melting furnace will operate under specific conditions despite varying composition of the batch and will supply molten glass which can be further processed with no problems.

A preferred method of operating the glass melting furnace in accordance with the invention provides that a dried batch of asbestos or asbestos-containing demolition material and/or ash and/or filter dust, as well as alkaline extrusive rock and sand is placed in the glass melting furnace, the extrusive rock and sand together amounting to no more than 30% of the weight of the batch. In this manner the costs of aggregate materials are kept very low, resulting overall in very inexpensive furnace operation. To prevent water from entering the furnace, the batch is preferably transported in a conveyor and drying apparatus running upward at an angle into the melting furnace, while water is removed at its bottom end.

DETAILED DESCRIPTION OF THE PREFERRED EMBODIMENT

Figure 1:
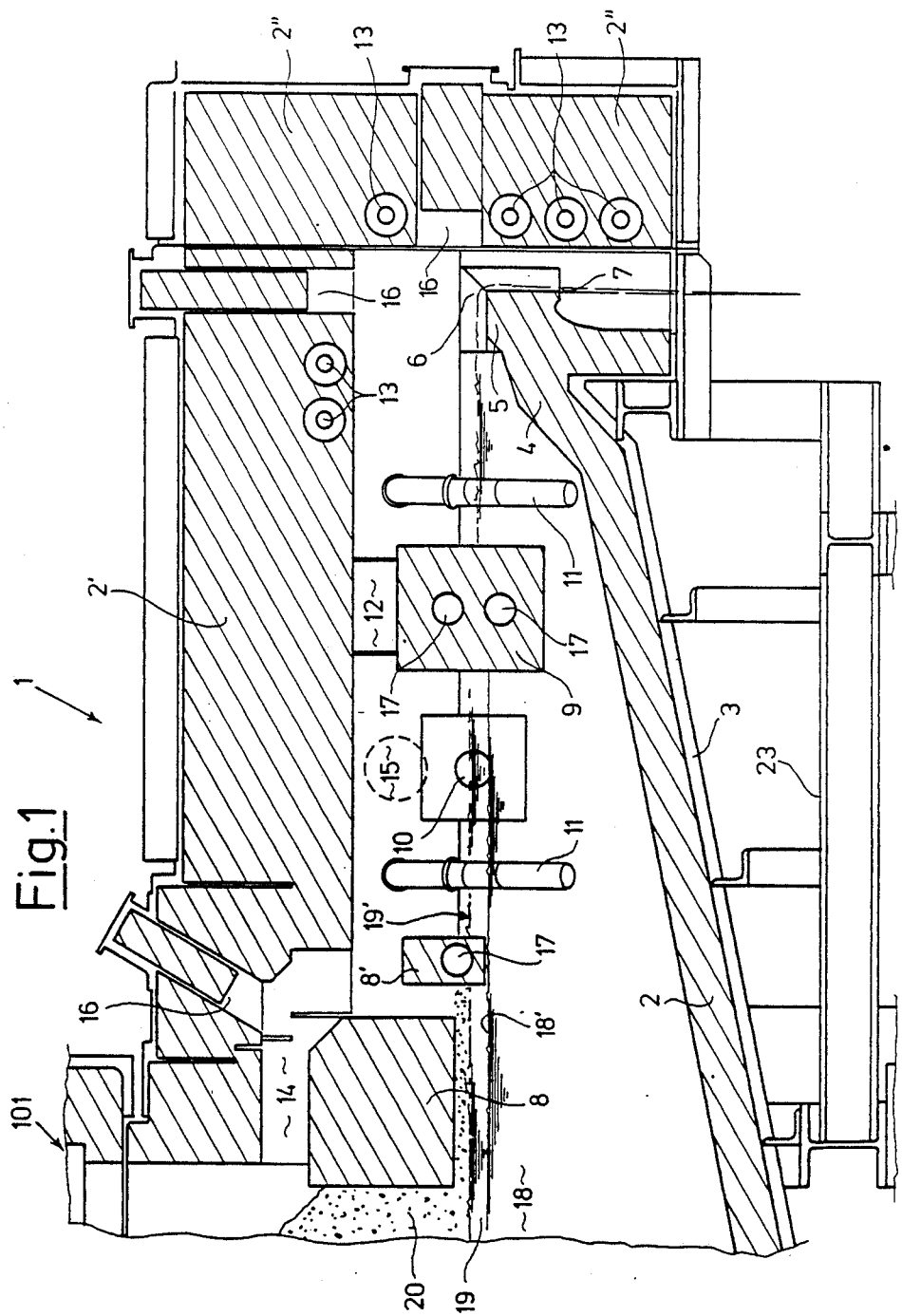
FIG. 1 is a partial side section taken through the glass melting furnace.

As FIG. 1 of the drawing shows, the embodiment of the glass melting furnace represented consists essentially of a melting section 101 and a withdrawal section 1. The melting section 101 is of a commonly used design and therefore only a small part of it is shown here.

The withdrawal section 1 of the glass melting furnace is divided from the melting section 101 by a first dividing wall 8 which extends downwardly into the interior of the furnace. The bottom edge of the first dividing wall 8 is situated just above the surface 19' of a molten sulfates layer 19. Underneath the sulfates layer 19 is the molten glass 18 which due to its higher density fills the lower part of the glass melting furnace and the withdrawal section 1. The batch 20 that is to be melted lies on the sulfates layer 19 in the melting section 101 and is mostly held back by the first dividing wall 8' which is vertically displaceable. A small part of the batch 20 still passes under the bottom of the first dividing wall, but it is finally stopped by a dividing beam 8' having a horizontal lower edge and running parallel to the first dividing wall 8. The dividing beam 8' runs, like the first dividing wall 8' transversely through the withdrawal section 1, and its height is variable. To prevent heat damage to the dividing beam 8' the latter is provided with a coolant passage 17. Above the first dividing wall 8 and the dividing beam 8' can also be seen an exhaust passage 14 as well as a service opening 16 which in this figure is shown closed.

At its bottom, the withdrawal section 1 is defined by a floor 2 of refractory material which is provided externally with a cooling water jacket 3 and rests on a supporting framework 23 of steel beams. The bottom of the withdrawal section slopes steadily upward from the melting section 101 and terminates after an additional, steeper rise 4 in an overflow edge 5.

The upper part of the withdrawal section 1 is defined by a roof 2', also of refractory material. For the avoidance of heat losses, heating elements 13 are provided which are embedded in the refractory material in the side end wall section 2". Also, additional access openings 16 are provided in the side wall sections 2" and here are also shown closed with plugs.

Inside of the withdrawal section 1, between the first dividing wall 8 and the overflow 5, there is disposed an additional, second dividing wall 9, which also reaches downward into the interior of the withdrawal section 1, and into the glass melt 18. The bottom edge of the second dividing wall 9 thus lies beneath the level 18' of the glass melt 18. This dividing wall 9 is also provided with coolant passages 17. Above this dividing wall 9, a portion of the exhaust gas shutter 12 can be seen in the background, which can be opened if necessary.

Between the first dividing wall 8 and the dividing beam 8', on the one hand, and the second dividing wall 9 on the other, there is provided an opening 10 for the withdrawal of the molten sulfates. The bottom edge of the withdrawal opening 10 lies just above the surface 18' of the glass melt 18. Outside of the withdrawal section 1, the withdrawal opening 10 is provided with an adjustable sliding gate 21 which will be further described with the aid of FIGS. 2 and 3.

The withdrawal section 1 is furthermore equipped with heating electrodes 11, a first electrode 11 being disposed between the dividing beam 8' and the withdrawal opening 10 and a second electrode 11 between the second dividing wall 9 and the overflow 5. The electrodes 11 are passed through the side wall 2" of the withdrawal section 1 into its interior and project with a downward bend into the glass melt 18. The overflow 5 is coated with an electrically conductive material 6 so that the overflow can be used as an electrode. Underneath the overflow, at the bottom end of the electrically conductive coating 6, there is formed a drip edge 7 from which the molten glass falls freely downward, into a glass forming machine for example.

Finally, in FIG. 1, above the withdrawal opening 10, an exhaust flue 15 is indicated in broken lines, which in practice is disposed on the longitudinal side of the withdrawal section 1 opposite the withdrawal opening 10.

Figure 2:
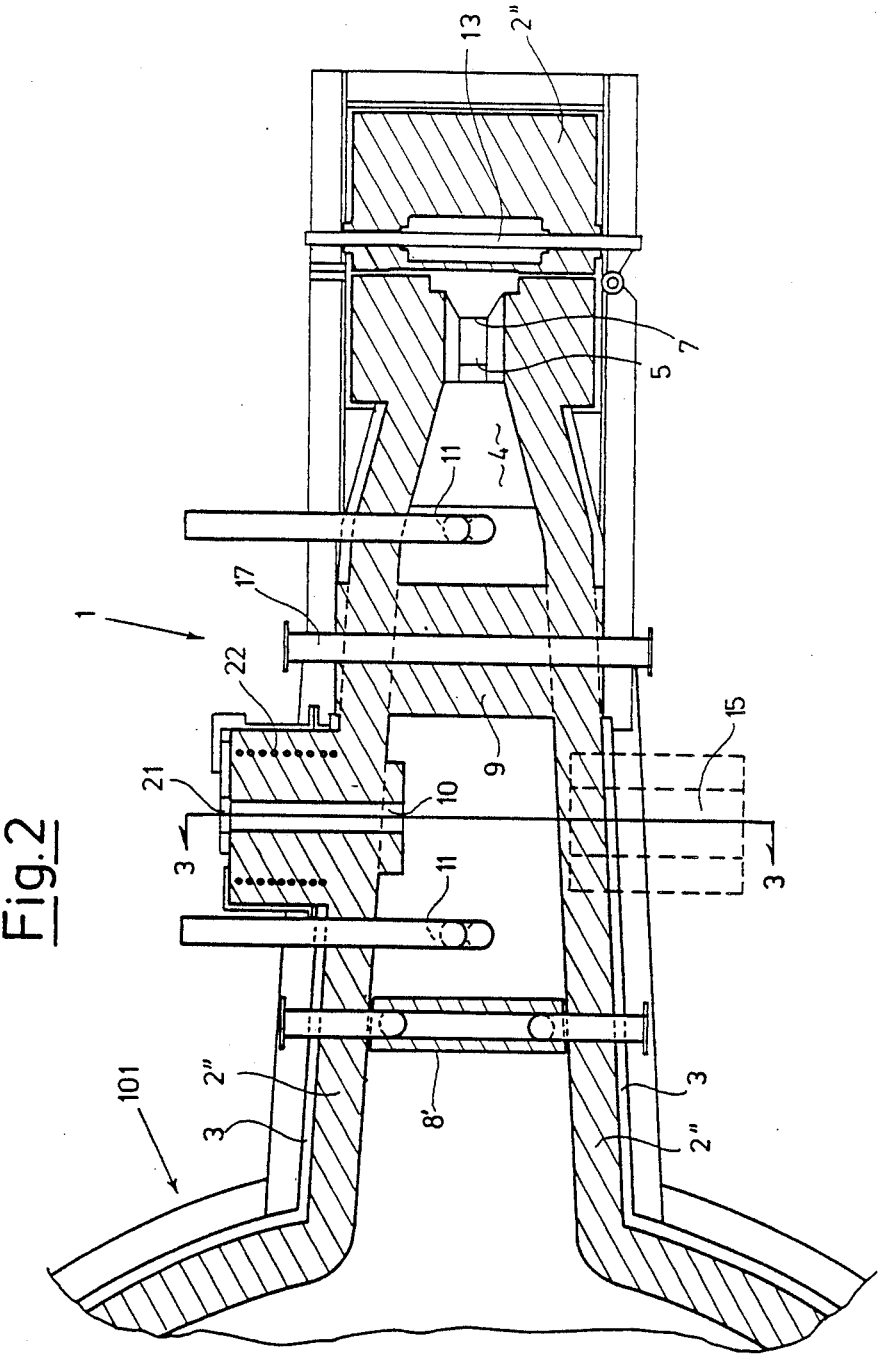
FIG. 2 is a plan section is a partial elevation section taken at about the level of the surface of the sulfates layer.

It can be seen from the horizontal section through the glass melting furnace represented in FIG. 2 how the dividing beam 8' and the second dividing wall 9 run transversely through the interior of the withdrawal section 1. The withdrawal section 1 has an elongated, narrowing form, while the melting section 101 is in this case of a round shape.

Laterally, the withdrawal section 1 is, again, defined by walls 2" of refractory material provided on the outside with the water cooling passages 3. On the right of the dividing beam 8'can be seen the first electrode 11; the second electrode 11 can be seen on the right of the second dividing wall 9. Conduits 17 carrying the coolant run longitudinally through the second dividing wall 9 as well as the dividing beam 8'.

On the rear wall, i.e., the upper wall 2" of the withdrawal section 1 in FIG. 2, can be seen the withdrawal opening 10, which runs in a substantially horizontal direction toward the side and terminates outside of the withdrawal section 1. On the outer end of the withdrawal opening 10 there is disposed an overflow gate 21 by whose adjustment the thickness of the sulfate layer 19 within the glass melting furnace can be adjusted. To prevent the molten sulfates from solidifying in the withdrawal opening 10, an arrangement of heating elements 22 is provided around it.

In the right-hand part of FIG. 2, can be seen, from left to right, the rising passage 4, the overflow 5 and the drip edge 7, which is followed at the right end by the end wall 2". Within this end wall 2" can again be seen the heating element 13.

In the lower middle part of FIG. 2 the exhaust flue 15 is again indicated by broken lines, being here situated above the plane of section in the withdrawal section 1.

Figure 3:
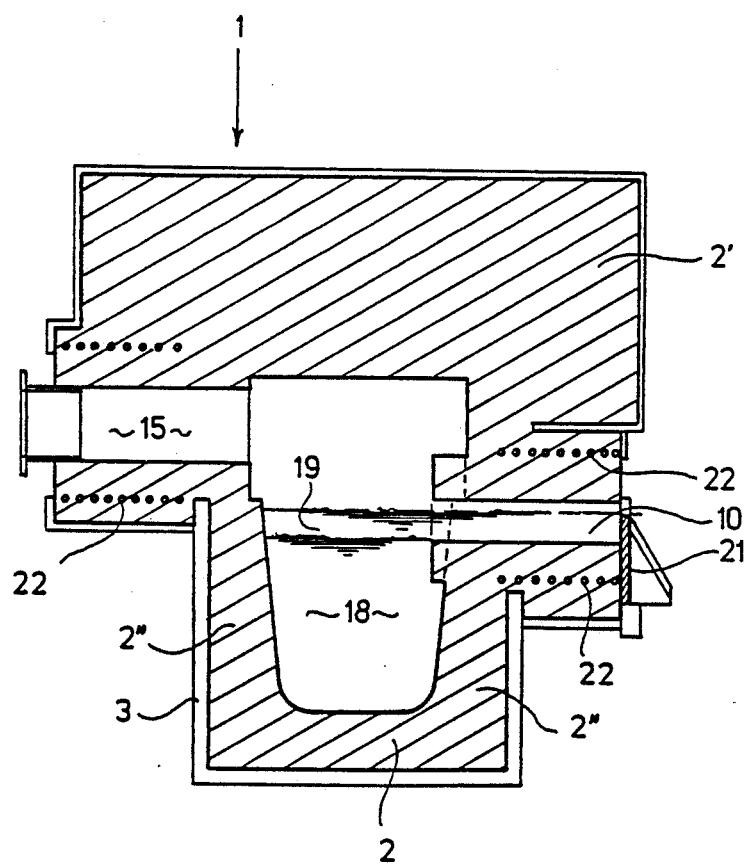
FIG. 3 shows the withdrawal part in a vertical cross section through the sulfates withdrawal opening.

FIG. 3 of the drawing finally shows in detail the disposition of the withdrawal opening 10 as well as the arrangement of the overflow gate 21 at the outer end of the withdrawal opening 10. As previously explained, the withdrawal opening 10 is the sulfates passage running laterally outward horizontally from the interior of the withdrawal section 1 where it can be closed by means of the adjustable overflow gate 21 or set to the desired level. In other words, more or less molten sulfate can be let out of the glass melting furnace according to the adjustment of the level of the overflow gate 21, so that the thickness of the sulfate layer 19 can be adjusted to any desired extent. In practice, a layer thickness of 2 to 5 cm has proven to be optimal.

In the lower part of the interior of the withdrawal section 1 can again be seen the glass melt 18 which is at such a level that it is not quite able to reach the level of the molten sulfate withdrawal opening. At the bottom, sides and top, the bottom 2, the side walls 2" and the roof 2' of refractory material can again be seen. In the lower part of the withdrawal section 1 of the glass melting furnace, the side walls 2" and the bottom 2 are surrounded by the water jacket 3.

As previously mentioned, an arrangement of heating elements 22 is provided in the area of the withdrawal opening 10.

On the opposite side from the sulfate withdrawal opening 10, but in the upper part of the interior of the withdrawal section 1, the previously mentioned exhaust flue 15 is disposed, which is also surrounded by an array of heating elements 22.

We claim:

1. Glass melting furnace having a melting section and a withdrawal section bounded by side walls of refractory material and extending to an outer end remote from said melting section, and, in operation, a molten glass layer having a surface, a molten layer of undissolved sulfates, and a batch of material to be melted succeeding one another from the bottom up in the melting section, the withdrawal section being separated from the melting section by a first dividing wall extending downwardly into the furnace interior and terminating at a distance from the furnace floor, a second dividing wall being disposed for the formation of an underside glass passage in the withdrawal section, and a glass outlet formed by an overflow edge at the outer end of the withdrawal section, wherein the first dividing wall terminates above the surface of the molten glass for retaining most of the batch and forming a batch layer on top of the molten layer of undissolved sulfates and in the withdrawal part, between the first dividing wall and the second dividing wall, at the level of the undissolved sulfate layer, at least one closable withdrawal opening is disposed through one of said side walls for withdrawing undissolved sulfates, said withdrawal opening having a bottom boundary whose height is adjustable, whereby it can be adjusted to obtain a molten sulfate layer of desired thickness.

2. Glass melting furnace in accordance with claim 1, wherein said opening comprises a passage running substantially horizontally through said one side wall and an overflow gate of adjustable height extending from below into the passage to form the bottom boundary of said opening.

3. Glass melting furnace in accordance with claim 1, wherein the first dividing wall is vertically displaceable.

4. Glass melting furnace in accordance with claim 1, wherein between the second dividing wall and the first dividing wall, and between the second dividing wall and the overflow edge, at least one heating electrode is provided which extends into the molten glass layer.

5. Glass melting furnace in accordance with claim 1, wherein the overflow edge comprises an electrically conductive material so that it is usable as an additional electrode.

6. Glass melting furnace in accordance with claim 1, wherein the dividing walls are equipped with coolant passages.

7. Glass melting furnace in accordance with claim 6, wherein around the withdrawal opening, and in the area of the glass outlet within the side walls or refractory material defining the withdrawal section, heating elements are disposed.

8. Glass melting furnace in accordance with claim 1 wherein a vertically displaceable dividing beam having a horizontal lower edge, which is immersible downwardly at least into the sulfate layer, is disposed between the first and second dividing walls parallel to the first dividing wall.

9. Glass melting furnace as in claim 8 wherein between the second dividing wall and the vertically displaceable dividing beam, and between the second dividing wall and the over flow edge, at least one electrode is provided which extends into the molten glass layer.

10. Glass melting furnace as in claim 8 wherein the dividing walls and the dividing beam are equipped with coolant passages.

* * * * *